F. F. PHILLIPS.
HOLDING DEVICE FOR VEHICLE TIRES.
APPLICATION FILED NOV. 4, 1912.
1,137,350.
Patented Apr. 27, 1915.
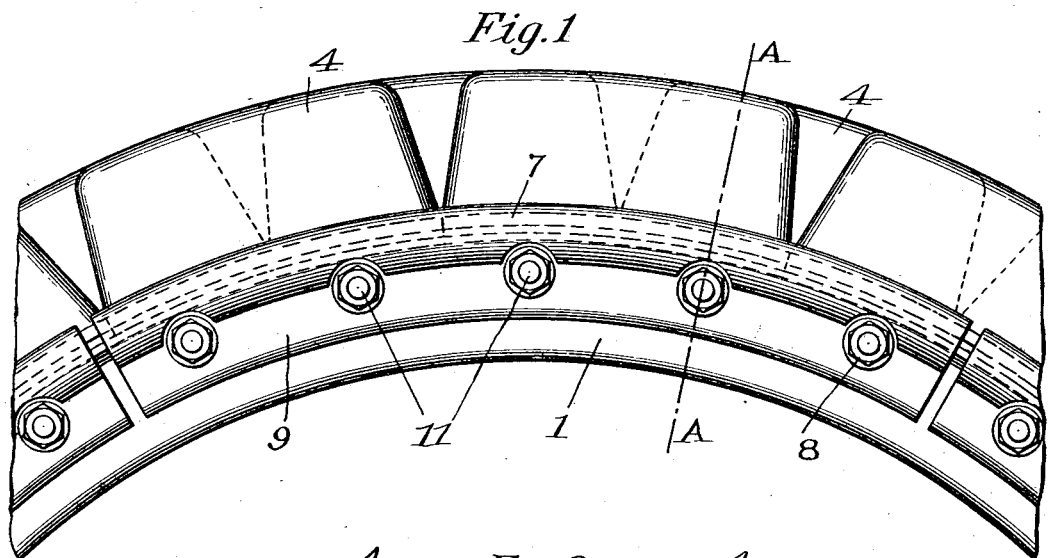
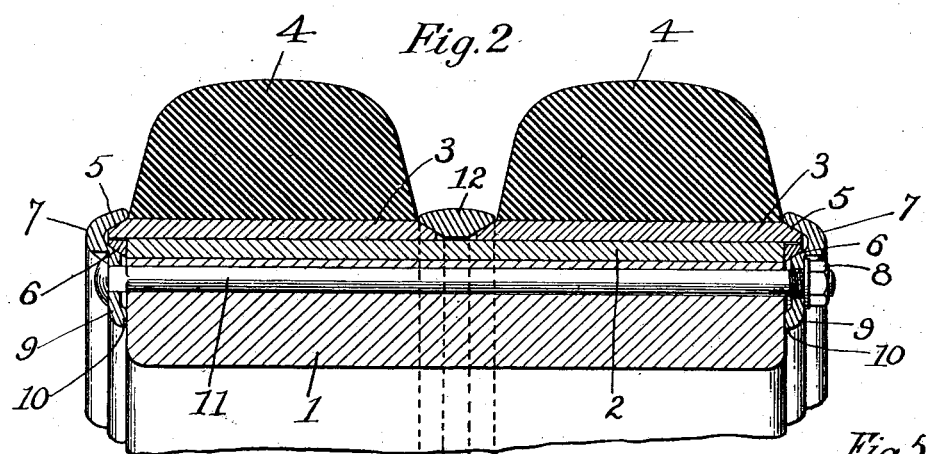
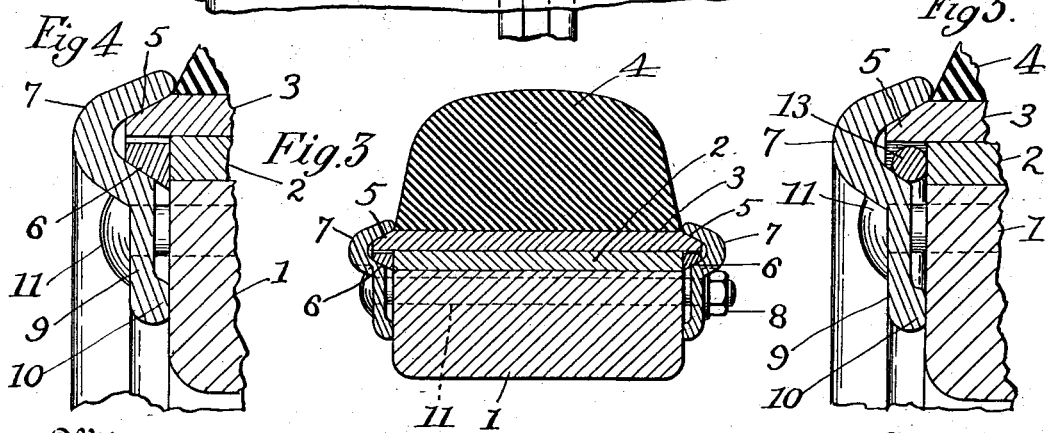
Witnesses:
Edw. W. Vaill
B. V. Mohan
Inventor
Frederick F. Phillips
By his Attorney
Ernest Hopkinson

UNITED STATES PATENT OFFICE.

FREDERICK F. PHILLIPS, OF FLUSHING, NEW YORK, ASSIGNOR TO THE HARTFORD RUBBER WORKS COMPANY, OF HARTFORD, CONNECTICUT, A CORPORATION OF CONNECTICUT.

HOLDING DEVICE FOR VEHICLE-TIRES.

1,137,350.   Specification of Letters Patent.   Patented Apr. 27, 1915.

Application filed November 4, 1912. Serial No. 729,307.

*To all whom it may concern:*

Be it known that I, FREDERICK F. PHILLIPS, a citizen of the United States, residing at Flushing, county of Queens, and State of New York, have invented certain new and useful Improvements in Holding Devices for Vehicle-Tires, of which the following is a full, clear, and exact disclosure.

My invention relates to that class of rims for vehicle tires in which the elastic tire itself is permanently mounted upon a plurality of plates so that parts or sections may be easily removed from or placed upon the rim and held in position thereon by means of clamping devices. This type of rim and tire is usually employed in connection with motor trucks on which the tire itself is made solid in cross section and divided into blocks or sections which are removable independently of each other.

The object of my invention is to produce a fastening or clamping device for the parts of the tire which will not only render the tire or sections thereof easily removable, but will clamp the same firmly and accurately in place at all times and under the great stresses to which such tires are subjected when in use.

For a full and detailed description of different forms of my invention, reference may be had to the following specification and to the drawing forming a part thereof, in which:

Figure 1 is a side elevation of my improved rim; Fig. 2 is a transverse sectional view taken substantially on the line A—A, Fig. 1; and Fig. 3 is a similar transverse sectional view showing my invention applied to a rim having a single tire mounted thereon; Fig. 4 is an enlarged sectional view similar to Figs. 2 and 3, but showing one side of the rim only; Fig. 5 is a similar sectional view showing a modification of the device.

Referring to the drawing, the numeral 1 indicates the usual wooden felly of the wheel.

The numeral 2 indicates the metallic felly band or fixed rim secured to the wooden felly.

The numeral 3 indicates the base plate or plates of the tire and the numeral 4 indicates the solid rubber tire comprising independently removable blocks mounted on the base plates 3. The felly band 2 is usually permanently attached to the felly 1 and forms an unyielding seat for the tire plates 3. As will be seen in the drawing, the felly band 2 is substantially the same width as the felly 1, while the outer edges of the tire plates 3 extend over or beyond the edges of the felly band, their outer corners being beveled, as indicated at 5. The angle formed between the overhanging edges of the tire band and the edges of the felly band is partly filled by separate retaining and wedging rings 6 made preferably of substantially the same shape as said overhanging edges, the inner sides of said rings being beveled, as indicated, to form wedges with the beveled surfaces 5, before referred to. In the modification illustrated in Fig. 5 the wedge-ring is replaced by an ordinary ring 13, circular in cross section. Other forms may be used as is found to be expedient.

The tire plates 3 and the wedge rings 6 are connected by a plurality of separate sections of grooved clamps 7, the groove being in the form of a V having inclined sides corresponding to the bevel 5 on the edges of the tire plates and wedging rings 6. Sections of the grooved clamps 7 are provided with inwardly extending radial portions 9 which preferably terminate in beads 10 which bear against the felly. The grooved clamp sections 7 are held in position by means of bolts 11 which pass through holes therein and also through holes in the felly 1. These bolts may be of any form preferred, but I have shown the same consisting of the ordinary round bolt variety with the hexagonal nuts 8 at one end.

In case of two tires being used upon the same felly, I provide a central separating ring 12 which is beveled on its inner edges to correspond with the inclination of the bevel of the edges of the tire plates 3. It will be seen that this provides a clamping ring which holds the inner edges of the base or tire plates with the same force as applied to their outer edges. All the rings and bands referred to above are preferably endless, or without cuts.

It will be noted that the wedging rings 6 and 13 do not contact with the inner surfaces of the adjacent tire plates 3, a small space being left to allow for slight variations in the sizes of the felly bands and to insure a tight hold by the grooved clamping sections when the same are fully seated. A further advantage in the use of the separable wedging rings results from the fact that the bolts 11 are relieved of radial strains, the outward pull of the tire plates being counteracted by the retaining action of the wedging rings, thereby preventing outward radial movement of the tire plates 3 independently of transverse strains on the bolts 11 and the felly 1. The use of the wedging rings also does away with the necessity of special felly-bands with beveled edges so that standard wheels may be used without modification.

Having thus described these two forms of my invention, I do not wish to be understood as being limited to details of design or arrangement of parts as herein set forth, for various changes may be made without departing from the spirit of my invention. For example, the tire base plates 3 may not be of the short length indicated, but may extend over a larger part of circumference of the wheel. In the same way the grooved clamping sections 7 may be made longer or shorter. However, for the sake of easy removability of separate pieces or blocks of the tire when worn or damaged, I prefer to make the clamping part referred to in sections as illustrated.

What I claim and desire to protect by Letters Patent is:

1. A holding device for vehicle tires, comprising, a fixed wheel member, a tire having a rigid base and extending laterally from the tire, a separate ring at the side of the fixed member of the wheel and adjacent the edge of the said base, and means engaging opposite sides thereof for drawing said tire base and ring respectively toward each other radially.

2. A holding device for vehicle wheels, comprising, a fixed member, a tire having a rigid base, a laterally projecting margin, a separate ring at the side of the fixed member of the wheel, and means including opposed parts engaging said tire base and ring on opposite sides to draw the same respectively toward each other radially, and devices for securing said holding means in position on said fixed member.

3. A holding device for vehicle tires, comprising a fixed wheel member, a tire base carried thereby, a separate ring extending laterally at the side of said fixed member, clamping means having a wedge-shaped groove for wedging said tire base and ring radially toward each other, and devices for securing said clamping means in position.

4. A holding device for vehicle tires, comprising a fixed wheel member, tire plates having beveled edges carried thereby, a ring extending laterally at the side of said fixed member, clamping means having a wedge-shaped groove for wedging said tire base and extending ring toward each other, and devices for securing said clamping means in position.

5. A holding device for vehicle tires, comprising a fixed wheel member, a tire having a rigid base carried thereby and extending laterally beyond said fixed member, a separate ring within the edge of said base and of less diameter than said fixed member, and means for clamping said tire base and ring toward each other radially.

6. A holding device for vehicle tires, comprising a fixed wheel member, a tire having a rigid base carried thereby and extending laterally beyond the fixed member, a separate ring at the side of said fixed member within the edge of said base, the external diameter of said ring being less than the internal diameter of said base, means for wedging said tire base and said ring toward each other radially, and devices for holding said wedging means in position.

7. A holding device for vehicle tires, comprising a fixed member, a tire having a plurality of rigid base plates, carried thereby and extending laterally beyond the fixed member, a separate ring at the side of said fixed member within the edges of said plate, the external diameter of said ring being less than the diameter of said fixed member, and external clamps carried by the fixed member for forcing said ring and base plates toward each other.

Signed at the city of New York, county and State of New York, this 31st day of October, 1912.

FREDERICK F. PHILLIPS.

Witnesses:
   EDWARD W. VAILL,
   C. ELLENBOGEN.